Feb. 28, 1950     A. P. BRUSH     2,498,848
GEAR UNIT
Filed May 14, 1947                                                    2 Sheets—Sheet 1
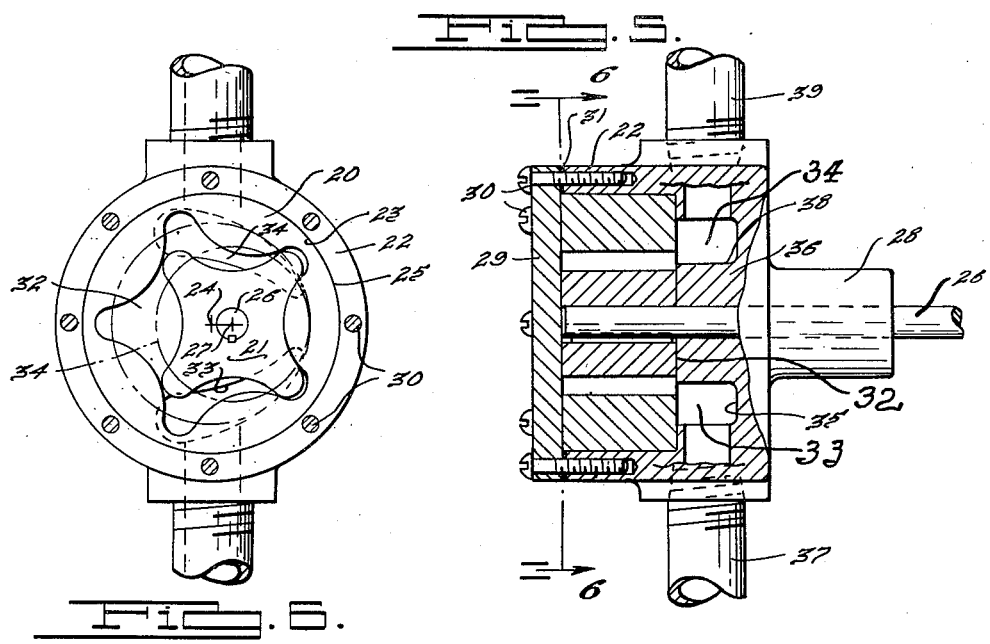
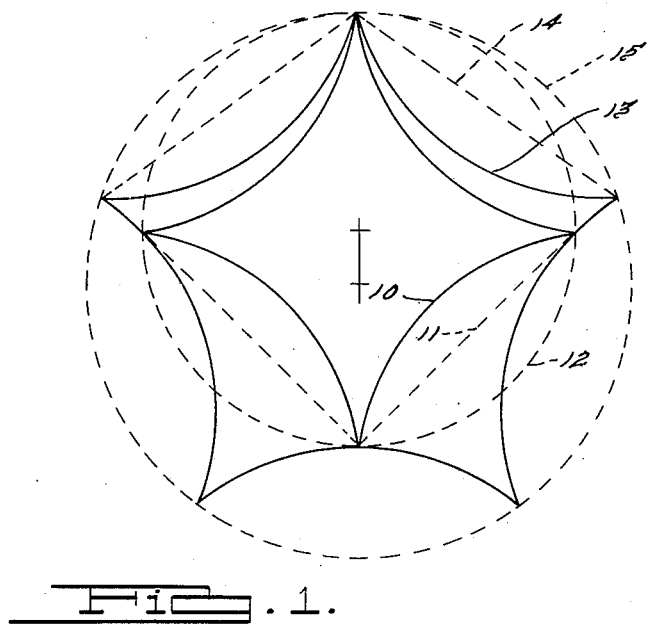
INVENTOR.
Alanson P. Brush.
BY Harness & Harris
ATTORNEYS.

Feb. 28, 1950     A. P. BRUSH     2,498,848
GEAR UNIT
Filed May 14, 1947     2 Sheets-Sheet 2
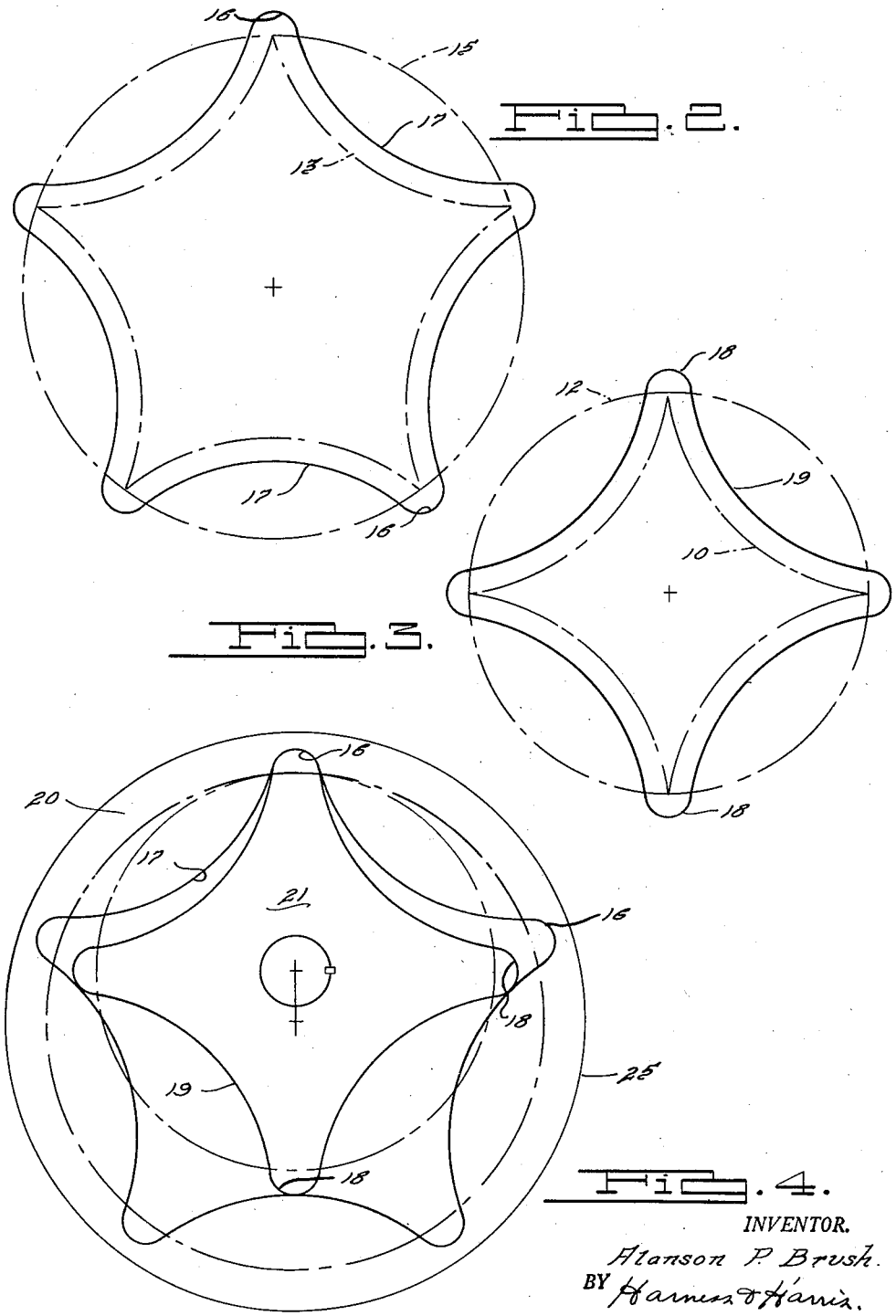
INVENTOR.
Alanson P. Brush.
BY Harness & Harris.
ATTORNEYS.

Patented Feb. 28, 1950

2,498,848

UNITED STATES PATENT OFFICE 2,498,848

GEAR UNIT

Alanson P. Brush, Detroit, Mich., assignor of one-half to Chrysler Corporation, Highland Park, Mich., a corporation of Delaware Application May 14, 1947, Serial No. 747,905

7 Claims. (Cl. 74—462)

This invention relates to an improved gear unit.

More specifically the invention pertains to an improved external-internal gear set which is particularly adapted for use in fluid pressure creating and fluid pressure propelled devices such as fluid pumps and fluid motors, respectively.

One of the main objects of the invention is to provide a pair of mating gears, one having external teeth and the other having internal teeth which are in continuous contact with corresponding external teeth of the first mentioned gear in all relative positions of the gears.

Another object of the invention is to provide contact surfaces on the teeth of gears of this kind which have pressure seal forming and long wear resisting characteristics.

A further object of the invention is to provide fragmentary cylindrical bearing surfaces between the teeth of such gears which have instantaneous cylindrical journal contact as each tooth of the inner gear passes through the position of full mesh.

An additional object of the invention is to provide curvatures on the teeth of such gears which have continuously curved successively adjacent increments of surface and which are free from interference in operation while in meshed engagement.

A still further object of the invention is to provide an improved method of developing a tooth curvature for gears of this character which can be conveniently and accurately produced on gear blanks by conventional machining operations and which does not require the generation of the curvature of any portions of the teeth of one gear from the curvature of any portions of the teeth of the other gear.

Inner and outer gear units especially adapted to propel and to be propelled by fluids and having teeth comprising combinations of hypocycloidal and epicycloidal contours have been known for many years as is well evidenced by the disclosure in Lilly British Patent No. 9359 of 1915. The outer portions of the teeth of the inner and outer gears of the Lilly patent are respectively of epicycloidal and hypocycloidal curvature and the flank portions of the teeth of the inner and outer gears are shaped to operatively fit the hypocycloidal and epicycloidal portions of teeth of the outer and inner gears respectively. That is, the portion of the tooth form lying outside the respective pitch circles are epicycloids and the portion of the teeth lying inside the pitch circles are hypocycloids. Therefore, on the outer gear, hypocycloidal curve portions are required to blend smoothly into epicycloidal curve portions. A similar situation occurs at the joining of the epicycloidal outer portions of the teeth of the inner gear with the hypocycloidal flank portions thereof. This same problem of joining hypocycloidal and epicycloidal tooth end and flank portions with precision is present in the well known cycloidal gear design.

I have found that the difficulty of joining together tooth portions of separate curve systems can be avoided while at all times maintaining each tooth of one gear of a pair of meshed internal-external tooth gears in sealing contact with a tooth of the other gear. This is accomplished by employing in the teeth of both of a pair of such gears, a tooth contour which is derived solely from hypocycloidal curves, the tooth curves of rotors having tooth curvatures derived from hypocycloidal curves are referred to herein and in the claims as "augmented hypocycloids" for, as will be seen in the drawings, the contour of each rotor comprises a continuous curve spaced uniformly a predetermined distance outwardly from a series of contacting hypocycloids having equal chordal lengths within a circumscribing circle which is the pitch circle. The tooth curvature derived from hypocycloidal curves is in fact a curve which is parallel to a hypocycloid. Therefore, tooth curvatures derived from this system of curves may be properly defined as "para-cycloids" or "para-cycloidal" curves. These terms are herein and in the claims used in a generic sense to denote curves located on the concave side of, and having all portions equally spaced from, a hypocycloidal curve. Since each end of each hypocycloidal curve of such series of contacting curves is a point in the pitch circle, the portions of "para-cycloidal" curves about such points are of fregmentary circular contour and a single "para-cycloidal" curve constitutes the entire tooth and space contour of each gear.

Since the contours of the gears are derived from the series of hypocycloidal curves as described the resulting gear members will operate in continuous contact in all positions and if either gear rotates at uniform angular velocity the other gear must also rotate at uniform angular velocity.

Illustrative embodiments of the invention are shown in the accompanying drawings, in which:

Fig. 1 is a diagrammatic view illustrating the mating and free running relationship of two series of true hypocycloidal curves each series having equal chordal lengths in a circumscribing circle respectively.

Fig. 2 is an illustrational view showing in full lines the perimeter contour of the cavity of an outer gear member and showing in dot and dash lines a series of hypocycloidal curves from which that contour is developed.

Fig. 3 is an illustrational view showing in full lines the peripheral contour of an inner gear member and showing in dot and dash lines a series of hypocycloidal curves from which that contour is developed.

Fig. 4 is a plan view of meshed inner and outer gear members embodying the invention and conforming to the full line contours of Figs. 3 and 2, respectively.

Fig. 5 is a side elevational view of a pump having meshed inner and outer gear members embodying the invention.

Fig. 6 is a vertical sectional view taken on line 6—6 of Fig. 5.

In Fig. 1 of the drawings is illustrated a series of contacting hypocycloidal curves 10 having equal chords 11 circumscribed within a circle 12 which represents the pitch circle of an inner gear member of a pair of meshed outer and inner gears. There is also shown in Fig. 1, a series of contacting hypocycloidal curves 13 having equal chords 14 within a circumscribing circle 15 which represents the pitch circle of an outer gear member of a pair of meshed outer and inner gears. The eccentricity of the pitch circles 12 and 15 is of a selected value and from it is determined the difference in the diameters of the pitch circles. In an outer and inner gear set having a tooth difference of one, the diameter of the pitch circle 15 of the outer gear is larger than the diameter of the pitch circle 12 of the inner gear by an amount equal to twice the eccentricity of the pitch circles. In the illustration shown, the outer gear member has five teeth and the inner gear member has four teeth.

It will be seen from an examination of Fig. 1, that, although the tooth contours formed by such series of contacting hypocycloids will mesh and contact at all relative positions of the outer and inner gears, the ends of the teeth of an inner gear member having such tooth contour are mathematical points and are so sharp that they lack the surface required to form fluid tight seals by engagement with the contour of the outer gear. Such sharply pointed teeth would also wear excessively in operation.

I have found that the disadvantages of the sharp pointedness of these points of contact of hypocycloidal curves can be avoided without loss of the meshing advantages of a gear tooth system of this kind by employing in place of the mating series of hypocycloidal curves, a pair of mating curves each of which is parallel to and located on the concave sides of the hypocycloidal curves of each series of curves 10 and 13. This is accomplished as illustrated in Figs. 1 to 3, inclusive, in the following manner: Mating series of hypocycloids 10 and 13 may be developed within their respective pitch circles 12 and 15, in a conventional manner by tracing the path of a point on a generating circle having a diameter of twice the eccentricity of the pitch circles, as a generating circle is rolled without slipping within first one and then the other of the pitch circles.

After the two series of mating hypocycloidal curves are thus developed, the outer and inner series of curves are modified in the manner illustrated in Figs. 2 and 3, respectively. This modification, in the case of the series of hypocycloidal curves, shown in Fig. 2, consists in describing a fragment of a circle 16 of selected radius about the points of contact of the curves on the concaved sides of the curves which is the side opposite from the center of the circle within which the series of hypocycloidal curves is inscribed. All portions of each circle fragment 16 are equally spaced from the point of contact of two adjacent hypocycloidal curves. The circle fragments 16 are then connected together by curves 17 which are spaced uniformly outwardly from each hypocycloid 13 as illustrated in Fig. 2, a distance equal to the selected radius of the circles 16. The curves 17 may be established accurately and conveniently by describing circular arcs (not shown) of the same radius as the circle fragments 16 about successive centers on each hypocycloid 13 and then drawing a curve tangent to such arcs and to the circle fragments 16. The resulting curves including their fragmentary circular portions are each uniformly spaced from all portions of the series of hypocycloids 13 and thus each resulting curve is parallel to one of the hypocycloid series, respectively. The series of hypocycloidal curves 13 is thus augmented by an amount equal to the radius of the circle fragments 16 and the resulting curves are logically referred to as "augmented hypocycloids."

The amount of augmentation may be selected within relatively widely spaced limits. This augmentation must be sufficient to provide ample bearing surface at the outer ends of the teeth bounded by the augmented hypocycloidal curves. It is not necessary to augment as far as theoretically possible. However, augmentation can theoretically be carried to that extent beyond which it is impossible to maintain parallelism between the hypocycloidal curve and any curve derived by augmentation of the hypocycloid.

The series of hypocycloidal curves 10 from which the inner rotor contour is developed is then augmented by the same amount and in the same way as the series of hypocycloidal curves 13 to produce fragments of circles 18 about the points of contact of the hypocycloids 10, and the fragments of circles 18 are connected together by curves 19 uniformly spaced outwardly from the series of hypocycloids 10 and tangent to the fragments of circles 18. Outer and inner gear members designated by numerals 20 and 21 respectively, having tooth contours illustrated in full lines in Figs. 2 and 3, are shown in meshed engagement in Fig. 4. These gear members may be of any desired thickness to predetermine the axial length of the teeth, the thicknesses of the gear members 20 and 21 being shown in Fig. 5. In Fig. 4 the outer and inner gear members 20 and 21, respectively are shown in their full-meshed positions at which the end of one tooth of the inner gear member 21, which is of fragmentary cylindrical shape, is in instantaneous journaled relationship with correspondingly shaped tooth space between a pair of teeth of the outer gear member 20. The tooth spaces of the outer gear and the ends of the teeth of the inner gear are designated in Fig. 4 by the numerals 16 and 18 which identify the corresponding circular portions of the contours shown in Figs. 2 and 3, respectively, provide effective, long wearing seals between the gear members at full mesh and the cylindrical surface portions 18 of each tooth of the inner member travels in continuous sealing contact with a tooth of the outer gear member between successive full mesh positions of the gears without excessive wear.

The gear members 20 and 21, shown in Fig. 4 are illustrated in Figs. 5 and 6 in a pump embodiment. The pump shown in the drawings comprises a casing 22 having a cylindrical bore 23 in which the outer gear 20 is journaled for rotative movement about an axis indicated at 24. The gear 20 has a cylindrical outer periphery 25 adapted to closely fit within the cylindrical bore 23 of the casing 22. The inner gear member 21 is keyed on a shaft 26 which is journaled in a boss 28 formed integral with the casing 22. The axis 27 of the shaft 26 is common with axis of the inner rotor 21 and it is eccentrically spaced with respect to the axis 24 of the outer rotor by an amount equal to one-half the difference of the diameters of the pitch circles of the inner and outer rotors 20 and 21, as explained in the discussion of Fig. 1.

The casing 22 has an end closure 29 on its left end, as viewed in Fig. 5, which is detachably secured to the casing 22 by screws 30, a gasket 31 may be provided between the casing 22 and cover 29 for forming a fluid tight seal therebetween. Provided at the opposite end of the cylindrical casing portion 22 is an end wall 32 in which inlet and outlet ports 33 and 34, respectively, are formed. The port 33 will serve as an inlet and the port 34 as an outlet during clockwise rotation of the inner and outer rotors, but their functions can be reversed by reversing the rotation of the rotors. Considering the rotation to be clockwise, as viewed in Fig. 6, then the inlet port 33 communicates with an inlet chamber 35 formed in an intermediate boss portion 36 adjacent the boss 28. The inlet chamber communicates with an inlet conduit 37 by which fluid is supplied to the pump. The outlet port 34 communicates with an outlet chamber 38 in the boss 36, and this outlet chamber is connected to an outlet pipe 39 through which fluid is discharged by the pump. The shaft 26 of the pump may be driven by any suitable means, not shown.

Although but one specific embodiment of the invention is herein shown and described, it will be understood that various changes in the sequence of operations, steps and materials employed may be made without departing from the spirit of the invention.

I claim:

1. A pair of outer and inner mating gears having a tooth difference of one, the entire contour of each gear consisting of a single continuous curve uniformly spaced from a series of contacting hypocycloids developed on the inside of the respective pitch circles of said gears and having joining ends contacting at common points on said respective pitch circles.

2. A pair of outer and inner mating gears having a tooth number difference of one and having continuous contact between teeth of one gear and all of the teeth of the other gear at all times, the contours of the teeth and tooth spaces of both gears consisting of a series of continuous, contacting substantially equally augmented true hypocycloids which are formed with their points of contact on their circumscribing pitch circles.

3. A pair of outer and inner mating gears, having substantially continuous contact between teeth of one gear and all the teeth of the other thereof in all relative angular positions of said gears, the contours of the teeth and tooth spaces of both said gears consisting of a series of continuous, contacting substantially equally augmented true hypocycloids, and said outer gear having one more tooth than said inner gear.

4. A gear unit including mating outer and inner gear members having respective pitch diameters, each gear member having a periphery consisting of a continuous curve spaced uniformly outwardly from a corresponding series of contacting hypocycloids having equal chordal lengths within a circumscribing circle of a diameter equal to its pitch diameter, respectively, the hypocycloids in the series of contacting hypocycloids from which is spaced the continuous curve of said outer gear member being one greater in number than the hypocycloids in the series of contacting hypocycloids from which is spaced the continuous curve of said inner gear member, the points of contact of each series of hypocycloids lying on the respective circumscribing circles, and means supporting said gear members for rotation about spaced axes.

5. A gear unit including mating outer and inner gear members, and means supporting said gear members for meshed rotation about axes having a predetermined spacing, said inner gear member having a periphery comprising a continuous curve spaced uniformly a predetermined distance outwardly from a corresponding series of contacting hypocycloids having equal chordal lengths within a circumscribing circle of selected diameter, said outer gear member having a periphery comprising a continuous curve spaced uniformly outwardly said predetermined distance from a corresponding series of contacting hypocycloids having equal chordal lengths within a circumscribing circle of a diameter equal to the summation of said selected diameter and twice said predetermined spacing of said axes, the points of contact of each series of hypocycloids lying on the respective circumscribing circles.

6. A gear unit including mating outer and inner gear members, and means supporting said gear members for meshed rotation about axes having a predetermined spacing, said inner gear member having a periphery comprising a continuous curve spaced uniformly a predetermined distance outwardly from a corresponding series of contacting hypocycloids having equal chordal lengths within a circumscribing circle of selected diameter, said outer gear member having a periphery comprising a continuous curve spaced uniformly outwardly said predetermined distance from a corresponding series of contacting hypocycloids having equal chordal lengths within a circumscribing circle of a diameter equal to the summation of said selected diameter and twice said predetermined spacing of said axes, said outer gear member having a continuous curve derived from a series of contacting hypocycloids having one more hypocycloid than the series of hypocycloids from which the inner gear contour is derived, the points of contact of each series of hypocycloids lying on the respective circumscribing circles.

7. A gear unit including mating outer and inner gear members, and means supporting said gear members for meshed rotation about spaced axes, said inner gear member comprising teeth having fragmentary cylindrical crown portions and all other portions of the tooth and space contours being spaced uniformly outwardly a distance equal to the radius of said crown portions from a corresponding series of hypocycloids having equal chordal lengths within a circumscribing circle and having successive hypocycloids contacting on said circle at the centers of curvature of said tooth crown portions, said outer gear member comprising teeth having crown portions comprising a series of curves spaced uniformly outwardly from a corresponding series of hypocycloids having equal chordal lengths within a larger circumscribing circle and having tooth spaces between adjacent teeth thereof terminating in fragmentary cylindrical contour conforming with the tooth crown portions of said inner gear member.

ALANSON P. BRUSH.

REFERENCES CITED

The following references are of record in the file of this patent:

UNITED STATES PATENTS

| Number | Name | Date |
|---|---|---|
| 1,682,563 | Hill | Aug. 28, 1928 |
| 1,682,564 | Hill | Aug. 28, 1928 |
| 2,031,888 | Hill | Feb. 25, 1936 |
| 2,091,317 | Hill | Aug. 31, 1937 |
| 2,373,368 | Witchger | Apr. 10, 1945 |